United States Patent
Lee et al.

(10) Patent No.: US 12,381,036 B2
(45) Date of Patent: Aug. 5, 2025

(54) MANUFACTURING METHOD OF CAPACITOR COMPONENT

(71) Applicant: SAMSUNG ELECTRO-MECHANICS CO., LTD., Suwon-si (KR)

(72) Inventors: Eung Seok Lee, Suwon-si (KR); Tae Gyun Kwon, Suwon-si (KR); So Hyeon Hong, Suwon-si (KR); Tae Sung Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 381 days.

(21) Appl. No.: 17/562,386

(22) Filed: Dec. 27, 2021

(65) Prior Publication Data
US 2023/0115369 A1  Apr. 13, 2023

(30) Foreign Application Priority Data

Oct. 13, 2021 (KR) .................. 10-2021-0135759

(51) Int. Cl.
*H01G 4/012* (2006.01)
*B41M 3/00* (2006.01)
*H01G 4/30* (2006.01)

(52) U.S. Cl.
CPC .............. *H01G 4/012* (2013.01); *B41M 3/00* (2013.01); *H01G 4/30* (2013.01)

(58) Field of Classification Search
CPC ........ H01G 4/012; H01G 4/30; H01G 4/0085; H01G 4/1227; H01G 4/12; H01G 13/00; H01G 4/1209; B41M 3/00
See application file for complete search history.

(56) References Cited

U.S. PATENT DOCUMENTS

| | | | |
|---|---|---|---|
| 2003/0167634 A1 | 9/2003 | Nakao | |
| 2004/0241586 A1 | 12/2004 | Hirai et al. | |
| 2009/0104384 A1* | 4/2009 | Nakao | H05K 3/125 216/13 |
| 2014/0265729 A1* | 9/2014 | Murakami | H10N 30/8536 310/365 |

(Continued)

FOREIGN PATENT DOCUMENTS

| | | | |
|---|---|---|---|
| JP | H06-96991 | * | 4/1994 |
| JP | WO2002086924 A1 | | 10/2002 |
| JP | 2017130298 A | | 7/2017 |

(Continued)

OTHER PUBLICATIONS

Office Action dated Feb. 27, 2025 issued in corresponding Korean Patent Application No. 10-2021-0135759 with the English translation.

*Primary Examiner* — Christopher W Raimund
(74) *Attorney, Agent, or Firm* — MORGAN, LEWIS & BOCKIUS LLP (57) ABSTRACT

A manufacturing method of a capacitor component includes: forming a dielectric green sheet and inkjet printing a conductive pattern on the dielectric green sheet. The inkjet printing the conductive pattern includes inkjet printing a base pattern on the dielectric green sheet; and inkjet printing a reinforcing pattern on at least a portion of each of both end portions of the base pattern in a width direction of the dielectric green sheet.

11 Claims, 8 Drawing Sheets

(56) References Cited

U.S. PATENT DOCUMENTS

2017/0207026 A1* 7/2017 Iwakoshi ................ B32B 27/08
2021/0074476 A1   3/2021 Kubota

FOREIGN PATENT DOCUMENTS

| JP | 2017-221917 A |   | 12/2017 |
|----|---------------|---|---------|
| JP | 2018082067 A  | * | 5/2018  |
| JP | 2019-176025 A |   | 10/2019 |
| JP | 2021-044317 A |   | 3/2021  |
| JP | 2021111661 A  | * | 8/2021  |
| KR | 10-2004-0080986 A |   | 9/2004 |

* cited by examiner

MANUFACTURING METHOD OF CAPACITOR COMPONENT

CROSS-REFERENCE TO RELATED APPLICATION(S)

This application claims benefit of priority to Korean Patent Application No. 10-2021-0135759 filed on Oct. 13, 2021 in the Korean Intellectual Property Office, the disclosure of which is incorporated herein by reference in its entirety.

BACKGROUND

The present disclosure relates to a manufacturing method of a capacitor component.

A multilayer ceramic capacitor (MLCC), a capacitor component, is an important chip component used in areas such as communications, information technology, home appliance and automobile manufacturing, and other industries, due to advantages thereof such as a small size, high capacitance, and ease of mounting, and in particular, is a core passive element used in various electric, electronic and information communication devices such as mobile phones, computers, digital TVs, and the like.

In general, an MLCC is manufactured by forming an unsintered internal electrode layer on a dielectric green sheet, stacking a plurality of dielectric green sheets on which an unsintered internal electrode layer is formed, and then sintering the same. Here, the unsintered internal electrode layer generally formed by screen-printina or gravure printing of a conductive paste, but there may be a limitation in thinning the internal electrode layer using the above described methods.

SUMMARY

An aspect of the present disclosure is to provide a manufacturing method of a capacitor component for thinning an internal electrode layer.

Another aspect of the present disclosure is to provide a manufacturing method of a capacitor component for improving thickness uniformity of an internal electrode layer.

According to an aspect of the present disclosure, a manufacturing method of a capacitor component includes forming a dielectric green sheet and inkjet printing a conductive pattern on the dielectric green sheet. The inkjet printing the conductive pattern includes inkjet printing a base pattern on the dielectric green sheet and printing a reinforcing pattern on at least a portion of each of both end portions of the base pattern in a width direction of the dielectric green sheet.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings. The terms used in the exemplary embodiments are used to simply describe an exemplary embodiment, and are not intended to limit the present disclosure. A singular term includes a plural form unless otherwise indicated. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof. Also, the term "disposed on," "positioned on," and the like, may indicate that an element is positioned on or beneath an object, and does not necessarily mean that the element is positioned on the object with reference to a gravity direction.

The term "coupled to," "combined to," and the like, may not only indicate that elements are directly and physically in contact with each other, but also include the configuration in which the other element is interposed between the elements such that the elements are also in contact with the other component.

Sizes and thicknesses of elements illustrated in the drawings are indicated as examples for ease of description, and exemplary embodiments in the present disclosure are not limited thereto.

In the drawings, an L direction is a first direction or a length direction, a W direction is a second direction or a width direction, a T direction is a third direction or a thickness direction.

Hereinafter, a manufacturing method of a capacitor component according to an embodiment of the present disclosure will be described in detail with reference to the accompanied drawings, and in the description with reference to the accompanied drawings, the same elements or elements corresponding to each other will be described using the same reference numerals, and overlapped descriptions will not be repeated.

Figure 9:
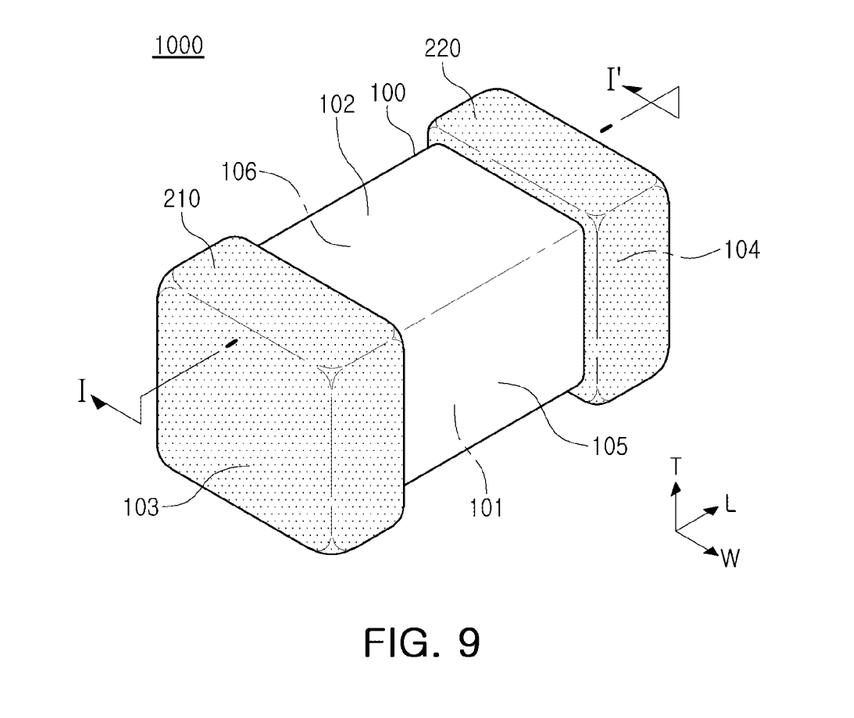
FIG. 9 is a diagram schematically illustrating an example of a capacitor component manufactured using a manufacturing method of a capacitor component according to an embodiment of the present disclosure.
Figure 10:
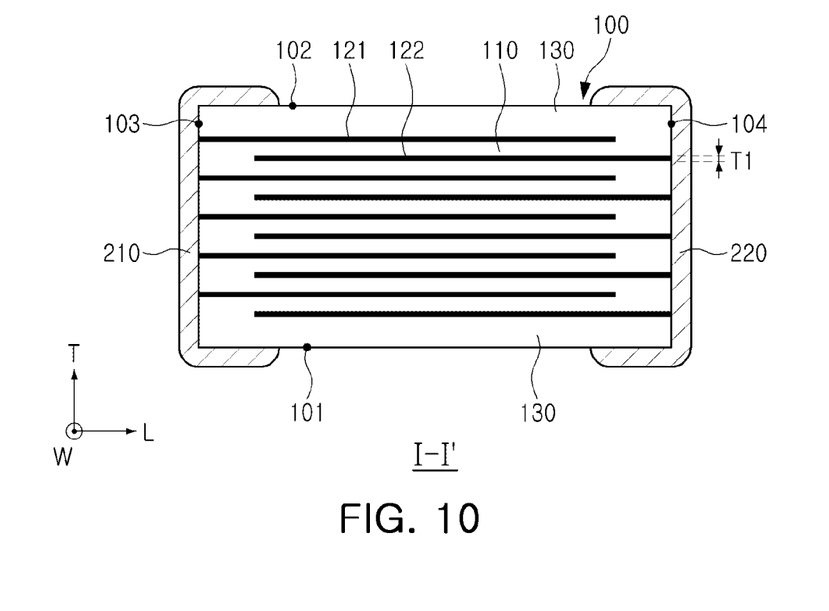
FIG. 10 is a view illustrating a cross-section taken along line I-I' of FIG. 9.

FIGS. 1 to 8 are views sequentially illustrating some processes of a manufacturing method of a capacitor component according to an embodiment of the present disclosure. FIG. 9 is a diagram schematically illustrating an example of a capacitor component manufactured by the manufacturing method. of a capacitor component according to an embodiment of the present disclosure. FIG. 10 is a view lust rating a cross-section taken along line I-I' of FIG. 9. Meanwhile, each of FIGS. 1 to 5 illustrates a plan view viewed from above and a cross-sectional view viewed from below.

Referring to FIGS. 9 and 10, a capacitor component 1000 according to the present embodiment includes a body 100 and external electrodes 210 and 220. The body 100 includes a dielectric layer 110 and internal electrode layers 121 and 122.

The body 100 forms an exterior of the capacitor component 1000 according to the present embodiment. A specific shape of the body 100 is not particularly limited, but as illustrated, the body 100 may have a hexahedral or similar shape. Due to sintering shrinkage occurring during a sintering process, the body 100 may have a substantially hexahedral shape although without perfectly straight lines within the hexahedral shape.

Based on FIGS. 9 and 10, the body 100 includes a first surface 101 and a second surface 102 facing each other in a thickness (T) direction, a third surface 103 and a fourth surface 104 facing each other in a longitudinal (L) direction, and a fifth surface 105 and a sixth surface 106 facing each other in a width (W) direction. Each of the third to sixth surfaces 103, 104, 105, and 106 of the body 100 corresponds to a wall surface of the body 100 connecting the first surface 101 and the second surface 102 of the body 100. Hereinafter, both end surfaces (one end surface and the other end surface) of the body 100 may mean the third surface 103 and the fourth surface 104 of the body, and both side surfaces (one side surface and the other side surface) of the body 100 may mean the fifth surface 105 and the sixth surface 106 of the body 100. In addition, one surface and the other surface of the body 100 may mean the first surface 101 and the second surface 102 of the body 100, respectively. One surface 101 of the body 100 may be used as a mounting surface when the capacitor component 1000 according to the present embodiment is mounted on a mounting substrate such as a printed circuit board, or the like.

The body 100 includes a dielectric layer 110 and first and second internal electrode layers 121 and 122 alternately disposed with the dielectric layer 110 interposed therebetween. Each of the dielectric layer 110, the first internal electrode layer 121, and the second internal electrode layer 122 is formed of a plurality of layers. Hereinafter, the first and second internal electrode layers 121 and 122 will be collectively referred to as internal electrode layers 121 and 122, except for a case in which it is necessary to distinguish therebetween. Accordingly, the description of a portion collectively referred to as the internal electrode layers 121 and 122 may be commonly applied to the first and second internal electrode layers 121 and 122.

A plurality of dielectric layers 110 forming the body 100 are in a sintered state, and boundaries between adjacent dielectric layers 110 may be integrated to such an extent that they may be difficult to determine without using a scanning electron microscope (SEM).

A raw material for forming the dielectric layer 110 is not particularly limited as long as sufficient capacitance can be obtained therewith. For example, the dielectric layer 110 may be formed by sintering the dielectric ceramic composition according to an embodiment of the present disclosure. A material for forming the dielectric layer 110, various ceramic additives, organic solvents, plasticizers, binders, dispersants, and the like may be added to powder such as barium titanate ($BaTiO_3$) according to the purpose of the present disclosure.

A cover layer 130 may be disposed on upper and lower portions of the body 100, that is, in both end portions of the body 100 in a thickness direction (T direction). The cover layer 130 may serve to maintain reliability of the capacitor component against external impacts. The cover layer 110 may be formed using a material for forming the dielectric layer 110 or a material different from the material for forming the dielectric layer 110. For example, in the latter case, the material for forming the dielectric layer 110 and the material for forming the cover layer 110 maybe different from each other in at least one of the a composition, a size, a content, and a dispersion degree of ceramic particles in the material, or may be different from each other in at least one of a size, a content, and a dispersion degree of subcomponents in the material.

The internal electrode layers 121 and 122 may be alternately disposed with the dielectric layer 110, and may include first and second internal electrode layers 121 and 122. The first and second internal electrode layers 121 and 122 may be alternately disposed to face each other with the dielectric layer 110 interposed therebetween, and may be exposed to the third and fourth surfaces 103 and 104 of the body 100, respectively.

The internal electrode layers 121 and 122 have a shape, similar to that of a plate as a whole, and are alternately exposed to (or are in contact with or extend from) the third surface 103 and the fourth surface 104, which are both end surfaces in a longitudinal direction of the body 100 (L direction), respectively, and are connected to first and second external electrodes 210 and 220. That is, the first internal electrode layer 121 is exposed to the third surface 103 of the body 100 to be connected to the first external electrode 210, and is not exposed to the fourth surface 104 of the body 100 to not be connected to the second external electrode 220. The second internal electrode layer 122 is exposed to the fourth surface 104 of the body 100 to be connected to the second external electrode 220, and is not exposed to the third surface 103 of the body 100 to not be connected to the first external electrode 210. Accordingly, the first internal electrode layer 121 is spaced apart from the fourth surface 104 of the body 100 by a predetermined distance, and the second internal electrode layer 122 is spaced apart from the third surface 103 of the body 100 by a predetermined distance. In this case, the internal electrode layers 121 and 122 maybe electrically separated from each other by the dielectric layer 110 disposed therebetween.

The internal electrode layers 121 and 122 may include, for example, one or more conductors of palladium (Pd), silver (Ag), nickel (Ni), and copper (Cu). For example, the internal electrode layers 121 and 122 may be formed by inkjet printing conductive droplets on a dielectric green sheet to form a conductive pattern on the dielectric green sheet, and stacking a plurality of dielectric green sheets on which the conductive pattern is formed, and then sintering the same. Here, the conductive droplets for forming the internal electrode layer may include a conductive powder containing nickel (Ni), a binder, a solvent, and the like.

An average thickness T1 of each of (or one of) the internal electrode layers 121 and 122 may be 200 nm or more and 250 nm or less. When the thickness T1 of the internal electrode layers 121 and 122 is less than 200 nm, connectivity of the internal electrode layers 121 and 122 maybe deteriorated, such that capacitance may be reduced. When the thickness T1 of the internal electrode layers 121 and 122 exceeds 250 nm, the dielectric layer 110 is formed to have a thin thickness based on a component having the same size, such that it may be difficult to provide electrical insulation between the internal electrode layers 121 and 122.

The average thickness T1 of the internal electrode layers 121 and 122 may be measured by using an optical image or an SEM image obtained by scanning a cross-section in a longitudinal direction-thickness direction (LT cross-section) of the capacitor component in a central portion in a width direction (W). As an example, the average thickness T1 of the internal electrode layers 121 and 122 may be determined by selecting any one of the internal electrode layers 121 and 122 shown in the image, and may mean that a dimension of a selected internal electrode layer in a thickness direction (T) multiple times in a longitudinal direction (L) and mathematically averaging the same. Measuring the dimension thereof multiple times in the longitudinal direction (L) may be performed at equal intervals in the longitudinal direction (L), but is not limited thereto. Alternatively, the average thickness T1 of the internal electrode layers 121 and 122 may be obtained by calculating a sum of average thicknesses of the internal electrode layers 121 and 122, measured for each of the plurality of internal electrode layers 121 and 122 shown in the image by the above-described method, and dividing the sum by the total number of the internal electrode layers 121 and 122.

Voids and ceramic particles may be disposed in the internal electrode layers 121 and 122. The ceramic particles may be due to ceramic powder such as barium titanate, or the like added additionally to the conductive droplet for forming the internal electrode layer. The ceramic particles maybe made of a barium titanate-based material in the same manner as the dielectric of the dielectric layer 110, but is not limited thereto. The voids may be formed due to diffusion and recrystallization in a sintering process of conductive powder such as nickel (Ni), or the like included in the conductive droplet, or may be formed by removing an organic material such as a solvent included in the conductive droplet during a heat treatment process such as a drying process and/or a sintering process.

External electrodes 210 and 220 are disposed on the body 100 and are connected to the internal electrode layers 121 and 122. As illustrated in FIGS. 9 and 10, the external electrodes 210 and 220 may include first and second external electrodes 210 and 220 respectively disposed on the third and fourth surfaces 103 and 104 of the body 100 and respectively connected to the first and second internal electrodes 121 and 122.

The first and second external electrodes 210 and 220 may include first and second connection portions respectively disposed on the third and fourth surfaces 103 and 104 of the body 100 to be connected to the first and second internal electrode layers 121 and 122, and first and second extension portions extending from the first and second connection portions to the first surface 101 of the body 100, respectively. The first and second extension portions are disposed to be spaced apart from each other on the first surface 101 of the body 100. Meanwhile, the first and second extension portions may extend not only to the first surface 101 of the body 100, but also to each of the second, fifth and sixth surfaces 102, 105, 106 of the body 100, but the scope of the present disclosure is not limited thereto. That is, as illustrated in FIG. 9, each of the external electrodes 210 and 220 of the present disclosure may be a normal type formed on five surfaces of the body 100, but is not limited thereto. It may be an L-type formed on two surfaces of the body 100, a C-type formed on three surfaces of the body 100, and the like.

The external electrodes 210 and 220 may be formed of any material as long as they have electrical conductivity, such as metal, and specific materials may be determined in consideration of electrical characteristics and structural stability, and further may have a multilayer structure. For example, each of the external electrodes 210 and 220 may include a first layer and a second layer, and the first layer may be formed by sintering a sintered conductive paste including a conductive metal and glass, or may be formed by curing a curable conductive paste including a conductive metal a base resin, or may be formed by vapor deposition. The second layer may be a nickel (Ni) plating layer and a tin (Sn) plating layer sequentially formed on the first layer by a plating method.

Meanwhile, in the present embodiment, a structure in which the capacitor component 100 has two external electrodes 210 and 220 is described, but the number and shape of the external electrodes 210 and 220 may be changed depending on the shape of the internal electrode layers 121 and 122 or other purposes.

Hereinafter, an example of a method of manufacturing the capacitor component shown in FIG. 9 will be described with reference to FIGS. 1 to 8.

Figure 1:
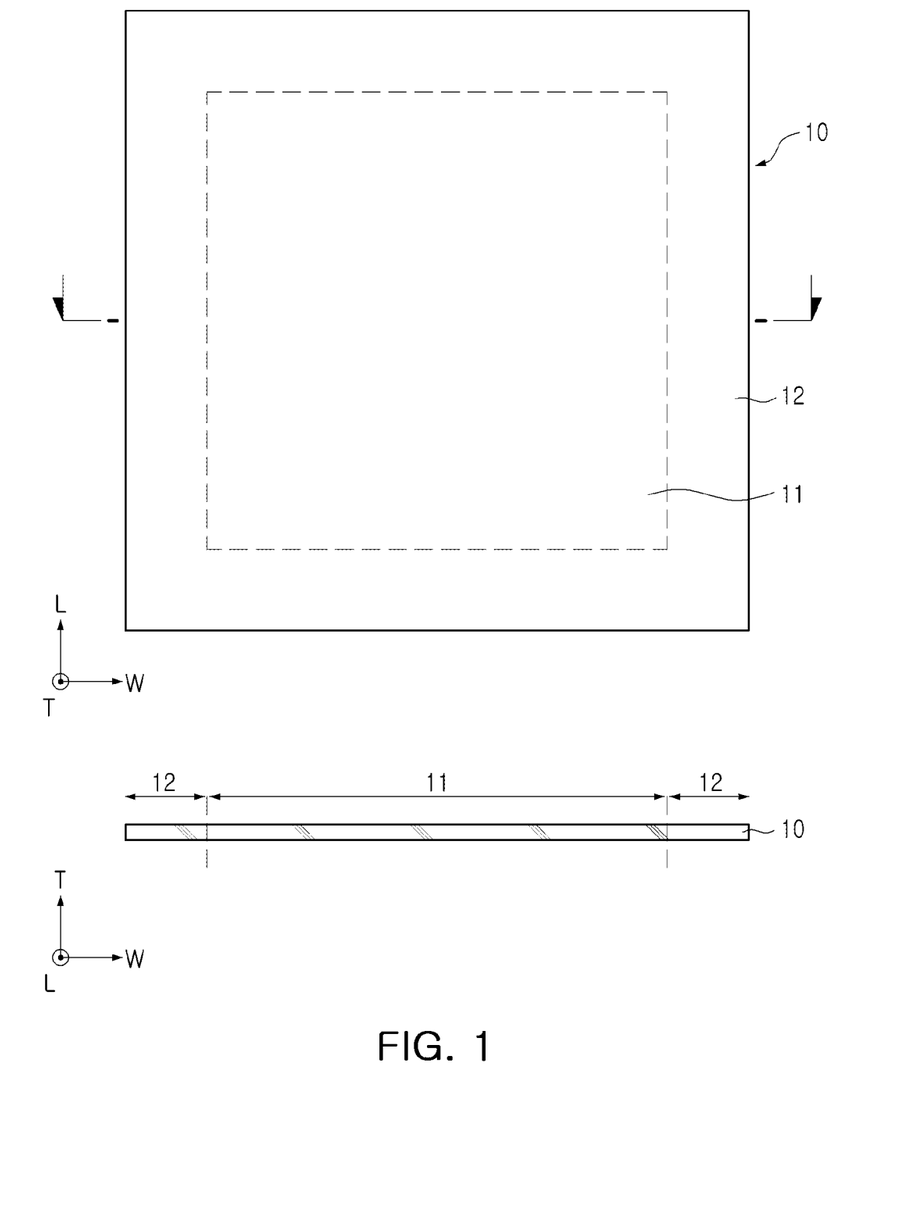
FIGS. 1 to 8 are views sequentially illustrating processes of a manufacturing method of a capacitor component according to an embodiment of the present disclosure.

First, as shown in FIG. 1, a dielectric green sheet is formed.

The dielectric green sheet 10 is configured to become the aforementioned dielectric layer 110 through a subsequent process, and may be formed of a dielectric paste. The dielectric paste may include various ceramic additives, organic solvents, plasticizers, binders, dispersants, and the like, added to ceramic powder such as barium titanate ($BaTiO_3$), which is a dielectric, according to the purpose of the present disclosure.

The dielectric green sheet 10 may be divided into an inner region 11 in which a conductive pattern 20 to be described later is formed, and an outer region 12 surrounding the inner region and in which a dummy pattern D to be described later is formed.

Meanwhile, although not shown, the dielectric green sheet 10 may be formed on a support plate such as a PET film or the like, and the support plate may support the dielectric green sheet 10 during the process.

Figure 2:
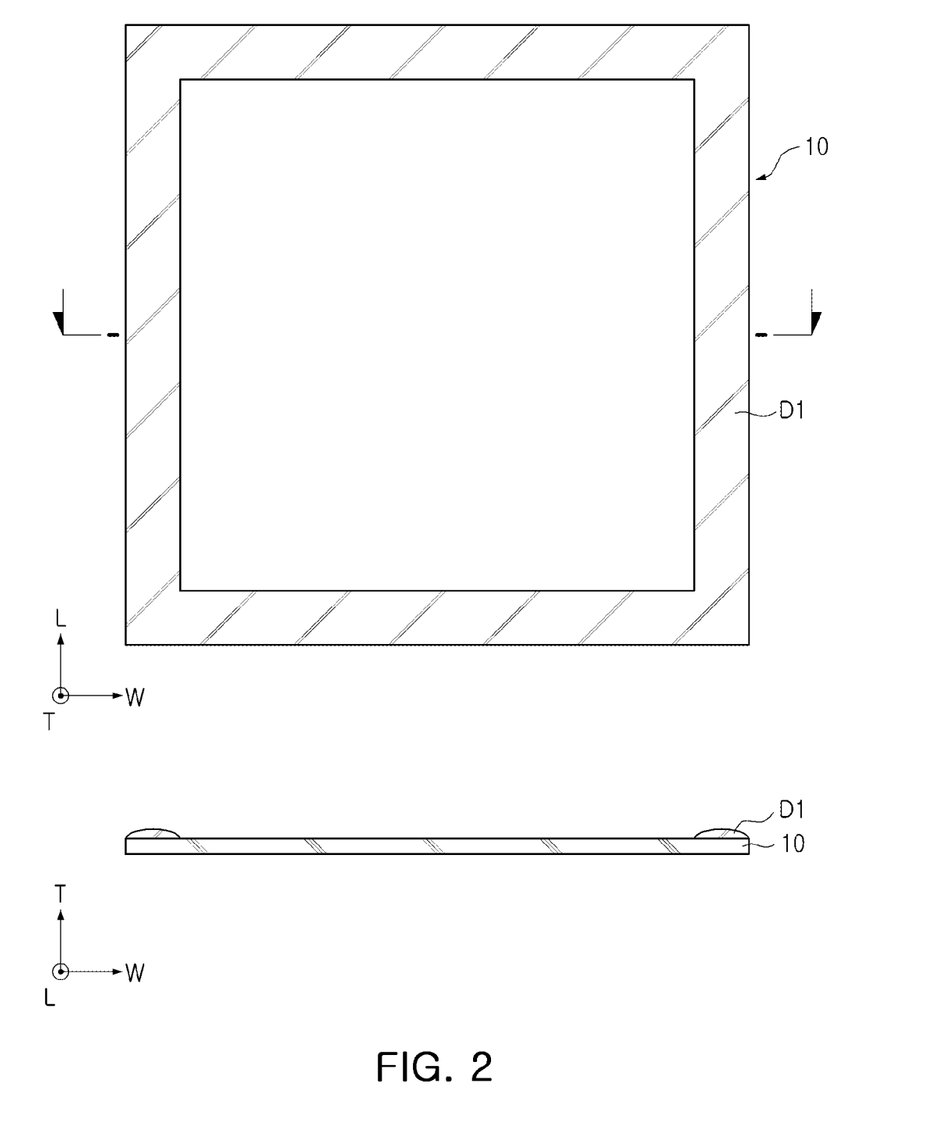
Figure 3:
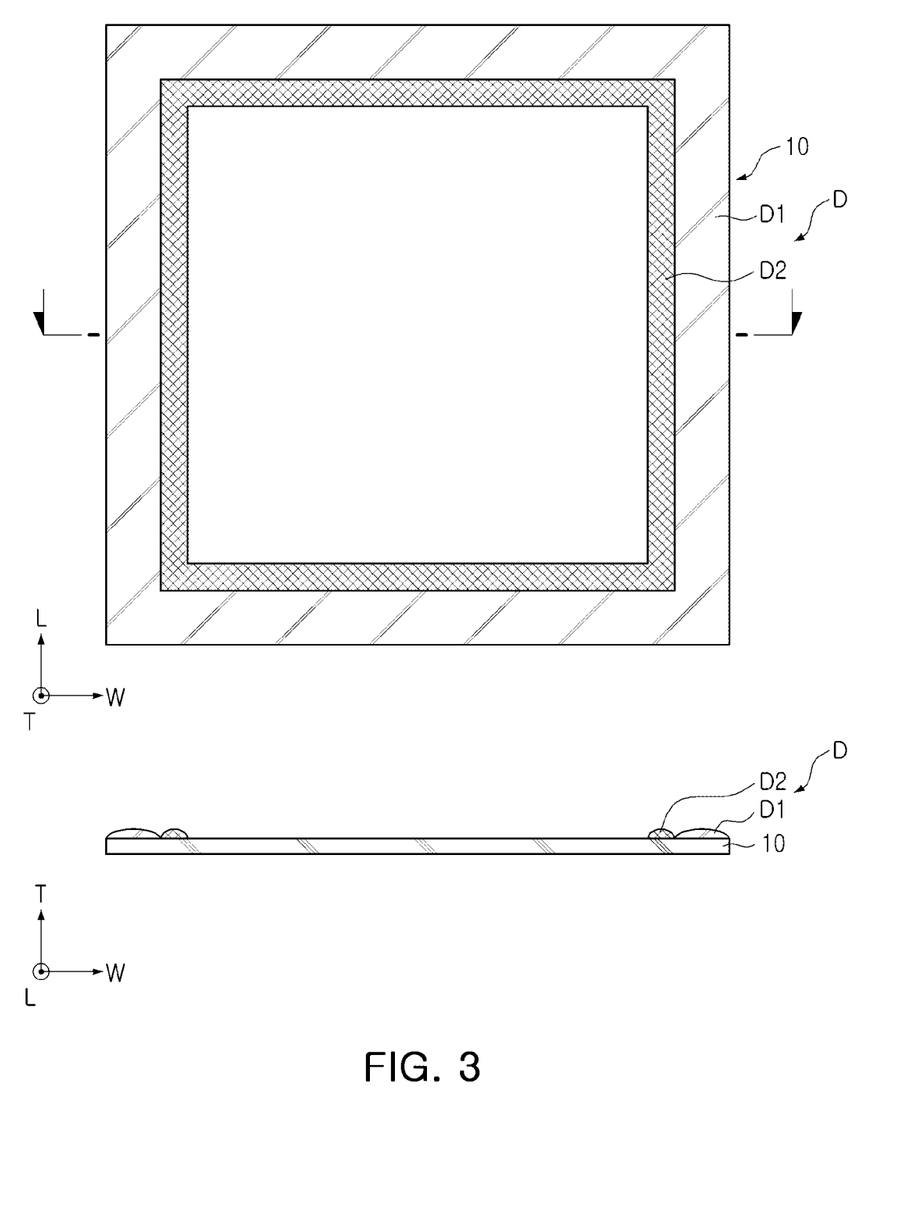

Next, referring to FIGS. 2 and 3, a dummy pattern is formed in an outer region of a dielectric green sheet.

A dummy pattern D includes an uncoated pattern D1 formed in an outermost portion of the outer regions 11 of the dielectric green sheet 10 and an index pattern D2 formed in a region closest to the inner region 12 among the outer regions 11 of the dielectric green sheet 10. The uncoated pattern D1 may refer to an outermost pattern or an edge pattern formed on an edge portion of the dielectric green sheet. Each of the uncoated pattern 11 and the index pattern 12 may be formed by inkjet printing. An inkjet head used for inkjet printing may include a plurality of outlets for discharging droplets. In the present process, the inkjet head may discharge droplets for forming an uncoated pattern and droplets for forming an index pattern, respectively, in order to form the dummy pattern D. The droplet for forming the uncoated pattern and the droplet for forming the index pattern may be formed of a material different from that of the dielectric green sheet described above and the conductive droplet for forming an internal electrode to be described later. For example, the droplet for forming an uncoated pattern and the droplet for forming an index pattern may not contain ceramic dielectric particles, unlike a dielectric paste for forming the dielectric green sheet, and may not contain conductive particles, unlike the conductive droplet for forming the conductive pattern. In the present embodiment, since the droplet for forming the dummy pattern D is formed of a material different from the dielectric paste for forming the dielectric green sheet and the conductive droplet for forming the conductive pattern, the dummy pattern D, which is a portion that does not remain in a final product, may be formed more simply and at reduced costs.

The uncoated pattern D1 may be, for example, disposed further outside of the index pattern D2 and the conductive pattern 20 to protect the index pattern D2 and the conductive pattern 20 from the outside. In addition, in a process of stacking a plurality of dielectric green sheets, to be described later, it is possible to prevent a step difference caused by not forming a pattern on the outer portion of the dielectric green sheet. The index pattern D2 may be, for example, a reference in a process of cutting a laminate 30 to be described later, but the scope of the present disclosure is not limited thereto. Meanwhile, in each of FIGS. 2 to 6, each of the uncoated pattern D1 and the index pattern D2 is shown to be formed in a rectangular ring shape, but this is merely an example. As another example, the index pattern D2 may be disposed on each of a plurality of dicing lines in a process of cutting the laminate 30, which will be described later, and formed to be spaced apart from each other.

Figure 4:
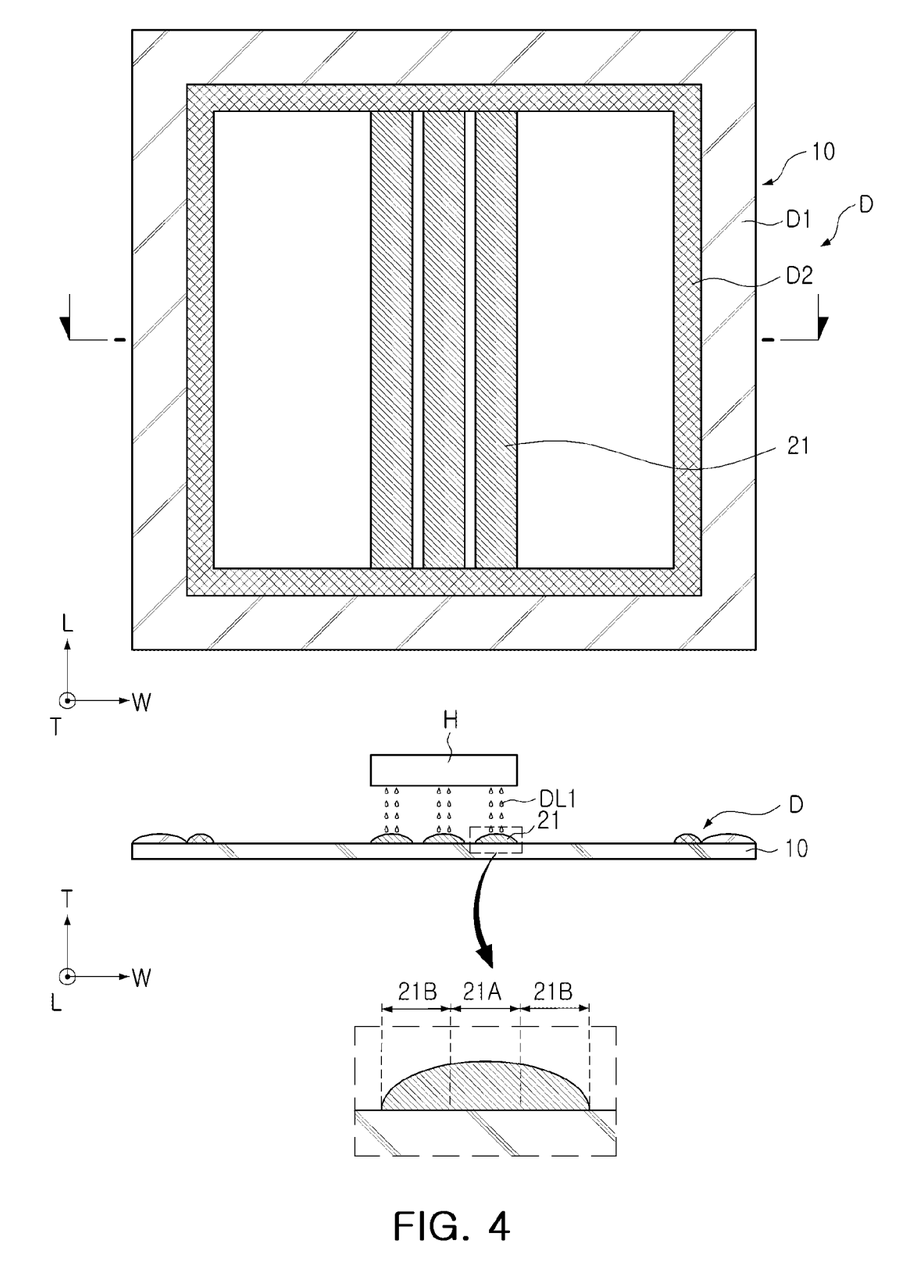
Figure 5:
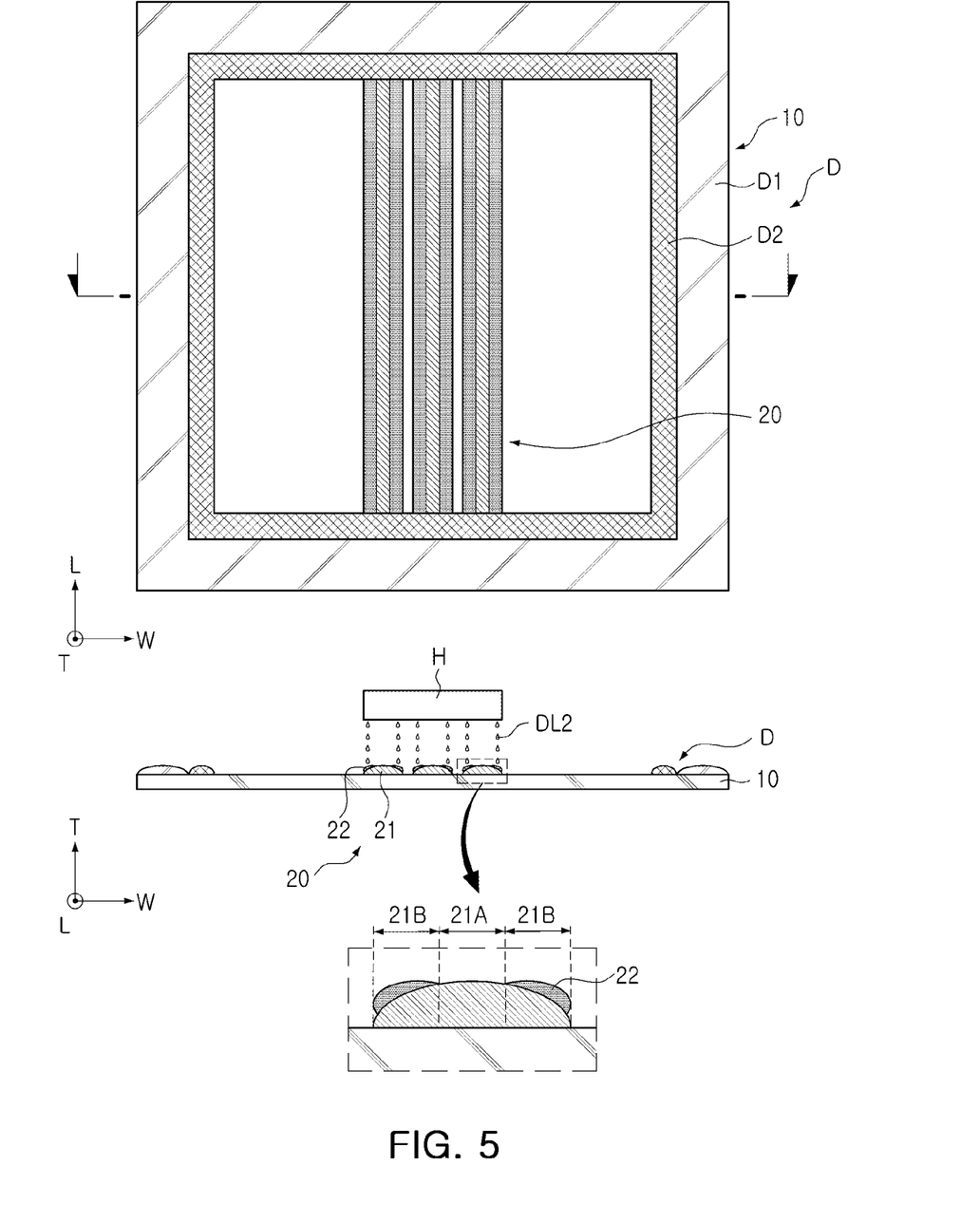
Figure 6:
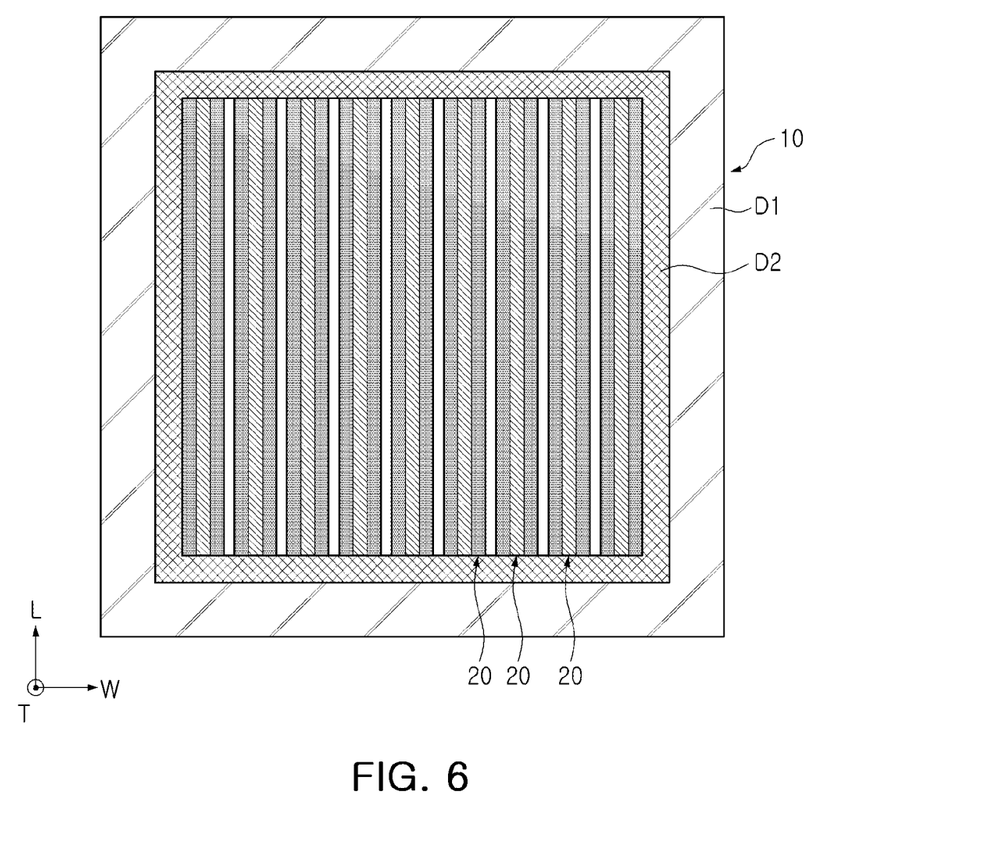

Next, referring to FIGS. 4 to 6, a conductive pattern is inkjet printed on the dielectric green sheet.

A conductive pattern (20 in FIG. 5) is configured to become internal electrode layers (121 and 122 in FIG. 10) of the capacitor component (1000 in FIG. 9) through a subsequent process. In the case of the present embodiment, as shown in FIG. 4, the conductive pattern 20 is formed by inkjet printing a base pattern 21, and as shown in FIG. 5, the conductive pattern 20 is formed by inkjet printing a reinforcing pattern 22 on at least a portion of both end portions 21B of the base pattern 21 in a width direction. The base pattern may have a stripe shape extending in the length direction.

First, as shown in FIG. 4, a base pattern of the conductive pattern 20 is formed in an inner region 11 of the dielectric green sheet by inkjet printing. In the present process, a conductive droplet DL1 used for inkjet printing to form a base pattern may be discharged through a plurality of outlets of an inkjet head H. Due to characteristics of inkjet printing and the conductive droplet DL1, the base pattern 21 may be printed to have an average thickness in a central portion 21A thereof in a width direction to be thicker than an average thickness in both end portions 21B thereof in the width direction. Here, the base pattern 21 may be printed such that the thickness of each of both end portions 21B in the width direction becomes thinner outwardly in the width direction. That is, the base pattern 21 may be formed to have a dome-shaped cross-section due to relatively low viscosity and surface tension of the conductive droplet DL1.

In the central portion 21A of the base pattern in the width direction and an outer portion 21B, a portion having a thickness of 90% or more compared to a maximum thickness of the base pattern 21 may be defined as a central portion 21A, and a portion having a thickness of 90% or less compared to a maximum thickness of the base pattern 21 may be defined as an outer portion 21B. Alternatively, the central portion 21A of the base pattern 21 in the width direction and the outer portion 21B thereof in the width direction may be defined, for example, by dividing a dimension of the base pattern in the width direction of into three equal parts.

The base pattern 21 may be formed in plural forms spaced apart from each other in the inner region 11 of the dielectric green sheet 10 using a single inkjet head H, by controlling whether or not the droplet DL1 of the plurality of outlets of the inkjet head H. Accordingly, even when the inkjet head H moves only once in a longitudinal direction L, the above-described plurality of base patterns 21, spaced apart from each other, may be formed.

Thereafter, as shown in FIG. 5, a reinforcing pattern 22 is formed by inkjet printing the droplet DL2 for forming a reinforcing pattern on at least a portion of each of both end portions 21B of the base pattern 21 in the width direction. For the above-described reasons, in the base pattern 21, both end portions 21B is formed to have a relatively thinner thickness than the central portion 21A, and the reinforcing pattern 22 is formed in at least a portion of the both end portions 21B of the base pattern 21, such that a difference in thickness of the base pattern 21 in the width direction is reduced. As a result, a difference in thickness of the conductive pattern 20 in the width direction may be alleviated due to the reinforcing pattern 22. In the present process, the conductive droplet DL2 used for inkjet printing to forma reinforcing pattern may be discharged through an outlet corresponding to a position of both end portions 21B of each base pattern 21 in the width direction among a plurality of outlets of the inkjet head H. To this end, the reinforcing pattern 22 may be formed only on at least a portion of both end portions 21B of the base pattern 21 in the width direction, but may not be formed in the central portion 21A of the base pattern 21 in the width direction. Since the reinforcing pattern 22 is formed in both end portions 21B of the base pattern 21 after the inkjet head H moves once in a longitudinal direction L to form the base pattern 21, the reinforcing pattern 22 is formed later than the base pattern 21 by one reciprocating time in a longitudinal direction L of the inkjet head H. To this end, the conductive droplet DL2 for forming the reinforcing pattern is formed on a surface of the base pattern dried during the time, the reinforce pattern 22 may be formed in both end portions 21B of the base patter 21, and a thickness of a region close to both ends of the base pattern in the width direction may be formed to be thicker than a thickness of a region close to the central portion 21A of the base pattern 21 in the width direction. Here, as a result of the above-described reason, that is, the base pattern 21 is dried for the above-described time after formation of the base pattern 21 to formation of the reinforcing pattern 22, the reinforcing pattern 22 may be formed in a shape not in contact with the dielectric green sheet 10, but, the scope of the present embodiment is not limited thereto. Meanwhile, the base pattern 21 and the reinforcing pattern 22 may be formed using the same conductive droplet. In this case, the manufacturing costs may be reduced, and the process and equipment may be simplified.

Thereafter, as shown in FIG. 6, the processes of FIGS. 4 and 5 are additionally repeated at least once to form a plurality of conductive patterns 20 in an inner region 11 of the dielectric green sheet 10.

Figure 7:
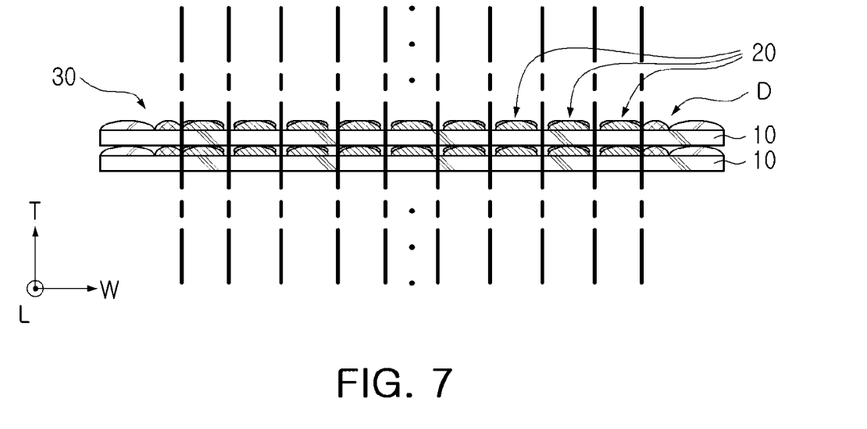
Figure 8:
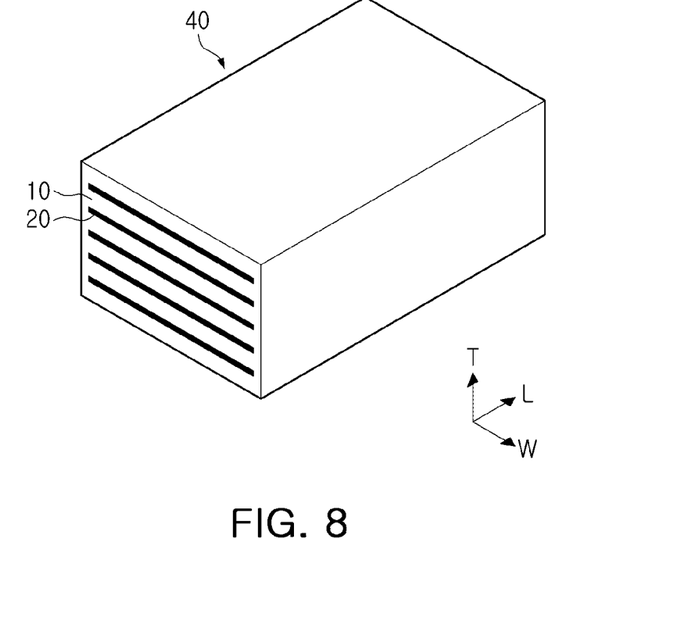

Next, referring to FIGS. 7 and 8, a laminate is formed by stacking a plurality of dielectric green sheets on which a conductive pattern is printed, and at least one green chip is formed by cutting the laminate.

First, the plurality of the processes shown in FIGS. 1 to 6 are repeated to forma plurality of dielectric green sheets 10 on which a conductive pattern 20 is printed. Next, a laminate 30 is formed by stacking the plurality of dielectric green sheets 10 each having the conductive pattern 20 printed thereon. In this case, a support plate described above may be formed on each dielectric green sheet 10, and a support plate attached to each dielectric green sheet 10 before a process of forming the laminate 30 may be removed.

Thereafter, the laminate 30 is cut to form a plurality of green chips 40 corresponding to a body of the capacitor component.

Next, although not shown, each green chip 40 is sintered to form a body (100 in FIG. 10) in which a dielectric 110 in FIG. 10) and internal electrode layers (121 and 122 in FIG. 10) are alternately disposed, and external electrodes (210 and 220 in FIGS. 9 and 10) are formed on both end surfaces (103 and 104 in FIGS. 9 and 10) of the body (100 in FIG. 10) facing in a longitudinal (L) direction.

In the present embodiment, a conductive pattern 20 for forming the internal electrode layers 121 and 122 is formed by inkjet printing, thereby reducing the thickness of the internal electrode layers 121 and 122 of a final component after firing. That is, in the case of conventional screen-printing and gravure printing, it may be difficult to thin the conductive pattern by printing a paste and further it may be difficult to reduce the thickness of the internal electrode layer. In the present embodiment, it is advantageous for thinning of the conductive pattern by forming the conductive pattern as a discharge of conductive droplets (inkjet printing). As a result, it is advantageous in reducing the thickness of the internal electrode layers 121 and 122 of the final component.

In addition, in the case of this embodiment, in forming the conductive pattern 20, a base pattern 21 is formed by inkjet printing, and a reinforcing pattern is additionally formed on both end portions 21B of the base pattern 21 by inkjet printing, thereby alleviating a thickness difference in the width direction of the base pattern 21 formed by inkjet printing. Accordingly, thickness uniformity in the width direction of the conductive pattern 20 may be improved, and as a result, the thickness uniformity of the internal electrode layers 121 and 122 of the final component may be improved.

As set forth above, according to an aspect of the present disclosure, a thickness of an internal electrode layer may be reduced.

According to another aspect of the present disclosure, thickness uniformity of an internal electrode layer may be improved.

While the exemplary embodiments have been shown and described above, it will be apparent to those skilled in the art that modifications and variations could be made without departing from the scope of the present invention as defined by the appended claims.

What is claimed is:

1. A manufacturing method of a capacitor component, comprising:
    forming a dielectric green sheet; and
    inkjet printing a conductive pattern on the dielectric green sheet, wherein the inkjet printing the conductive pattern includes:
    inkjet printing a base pattern on the dielectric green sheet, wherein the base pattern, after drying, has an average thickness in a central portion of the base pattern in the width direction that is thicker than an average thickness of both end portions of the base pattern in the width direction; and
    inkjet printing a reinforcing pattern on at least a portion of each of both end portions of the base pattern in a width direction of the dielectric green sheet,
    wherein each of the printed reinforcing patterns is thinner toward the central portion of the base pattern in the width direction compared to the thickness of the reinforcing pattern toward the end portion of the base pattern in the width direction.

2. The manufacturing method of a capacitor component of claim 1,
    wherein, in the inkjet printing the base pattern on the dielectric green sheet,
    the base pattern is printed to have a thickness of each of both end portions of the base pattern in the width direction to be thinner toward an outside in the width direction.

3. The manufacturing method of a capacitor component of claim 2,
    wherein, in the inkjet printing the reinforcing pattern,
    the reinforcing pattern is printed to have a thickness of a region close to both ends of the base pattern in the width direction to be thicker than a thickness of a region close to the central portion of the base pattern in the width direction.

4. The manufacturing method of a capacitor component of claim 3,
    wherein in the inkjet printing the base pattern and the reinforcing pattern,
    the base pattern and the reinforcing pattern are printed using a conductive droplet.

5. The manufacturing method of a capacitor component of claim 1,
    wherein in the inkjet printing the reinforcing pattern,
    the reinforcing pattern is printed so as not to contact the dielectric green sheet.

6. The manufacturing method of a capacitor component of claim 1, further comprising
    after forming the dielectric green sheet and before the inkjet printing the conductive pattern, forming a dummy pattern in an outer portion of the dielectric green sheet,
    wherein, in the inkjet printing the conductive pattern,
    the conductive pattern is printed inside the dielectric green sheet surrounded by the dummy pattern.

7. The manufacturing method of a capacitor component of claim 1,
    wherein, in the inkjet printing the conductive pattern,
    the conductive pattern is printed in plural forms spaced apart from each other in the width direction on the dielectric green sheet.

8. The manufacturing method of a capacitor component of claim 1, further comprising, after the inkjet printing the conductive pattern,
    forming a laminate by stacking a plurality of dielectric green sheets on which the conductive pattern is printed;
    forming at least one green chip by cutting the laminate; and
    forming a body in which a dielectric layer and an internal electrode layer are alternately disposed by sintering the green chip.

9. The manufacturing method of a capacitor component of claim 8, wherein an average thickness of the internal electrode layer is 200 nm or more and 250 nm or less.

10. The manufacturing method of a capacitor component of claim 1,
    wherein, in the inkjet printing the base pattern on the dielectric green sheet,
    the base pattern is printed to have a stripe shape extending in a length direction of the dielectric green sheet.

11. A manufacturing method of a capacitor component, comprising:
    forming a dielectric green sheet; and
    inkjet printing a conductive pattern on the dielectric green sheet,
    wherein the inkjet printing the conductive pattern includes:
    inkjet printing a base pattern on the dielectric green sheet, wherein the base pattern, after drying, has an average thickness in a central portion of the base pattern in the width direction that is thicker than an average thickness of both end portions of the base pattern in the width direction; and
    inkjet printing a reinforcing pattern on at least a portion of each of width-wise end portions of the base pattern, and the reinforcing pattern is not formed in the central portion of the base pattern in the width direction.

* * * * *